(12) United States Patent
Ito

(10) Patent No.: US 10,645,236 B2
(45) Date of Patent: May 5, 2020

(54) INFORMATION PROCESSING APPARATUS AND CONTROL METHOD FOR SYNCHRONIZING SETTING INFORMATION

(71) Applicant: CANON KABUSHIKI KAISHA, Tokyo (JP)

(72) Inventor: Keisuke Ito, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/755,319

(22) PCT Filed: Aug. 25, 2016

(86) PCT No.: PCT/JP2016/003868
§ 371 (c)(1),
(2) Date: Feb. 26, 2018

(87) PCT Pub. No.: WO2017/038057
PCT Pub. Date: Mar. 9, 2017

(65) Prior Publication Data
US 2018/0255191 A1 Sep. 6, 2018

(30) Foreign Application Priority Data
Aug. 31, 2015 (JP) ................................ 2015-171259

(51) Int. Cl.
*H04N 1/00* (2006.01)
*G06F 16/00* (2019.01)
(Continued)

(52) U.S. Cl.
CPC ......... *H04N 1/00244* (2013.01); *G06F 16/27* (2019.01); *H04L 41/0873* (2013.01);
(Continued)

(58) Field of Classification Search
CPC ....... H04N 1/00244; H04N 2201/0044; H04N 21/222; G05B 2219/31213;
(Continued)

(56) References Cited

U.S. PATENT DOCUMENTS

2004/0056889 A1* 3/2004 Katano ................... G06F 21/31
715/741
2009/0077263 A1* 3/2009 Koganti .................. G06F 16/27
709/248

(Continued)

FOREIGN PATENT DOCUMENTS

JP 2004-086800 A 3/2004
JP 2004-094294 A 3/2004
(Continued)

OTHER PUBLICATIONS

Microsoft, Windows Server 2003 R2: Extending Support for Branch Offices, May 2005.

*Primary Examiner* — Juan M Guillermety
(74) *Attorney, Agent, or Firm* — Canon U.S.A., Inc. IP Division

(57) ABSTRACT

An information processing apparatus includes a storage unit and a processing unit. The storage unit stores setting information of the information processing apparatus. The processing unit starts processing for causing, in a case where the number of servers each of which manages setting information stored in other apparatus, among apparatuses including the information processing apparatus and an apparatus connected to the information processing apparatus via a network is one, a server corresponding to the one to manage the setting information stored in the storage unit. The processing unit is also configured not to start the processing when the number of servers is two or more.

13 Claims, 9 Drawing Sheets

(51) Int. Cl.
*H04L 12/24* (2006.01)
*G06F 16/27* (2019.01)

(52) U.S. Cl.
CPC . *H04N 1/00408* (2013.01); *H04N 2201/0044* (2013.01); *H04N 2201/0094* (2013.01)

(58) Field of Classification Search
CPC ........... G05B 2219/31091; G05B 2219/31329; H04L 29/08144; H04L 29/08306; H04L 21/23103; H04L 21/23116; H04L 41/0246; H04L 2019/06054; H05K 7/1485
See application file for complete search history.

(56) References Cited

U.S. PATENT DOCUMENTS

| | | | |
|---|---|---|---|
| 2010/0058108 A1* | 3/2010 | Nammatsu | H04L 41/0677 714/39 |
| 2010/0077076 A1 | 3/2010 | Wada | |
| 2012/0307054 A1* | 12/2012 | Imanishi | H04N 21/431 348/143 |
| 2015/0188775 A1* | 7/2015 | Van Der Walt | G06F 3/0481 715/734 |
| 2015/0189116 A1 | 7/2015 | Ito | |
| 2015/0269036 A1* | 9/2015 | Yurchenko | G06F 16/27 707/615 |

FOREIGN PATENT DOCUMENTS

| | | |
|---|---|---|
| JP | 2005-157612 A | 6/2005 |
| JP | 2008-104075 A | 5/2008 |

* cited by examiner

[Fig. 1A]
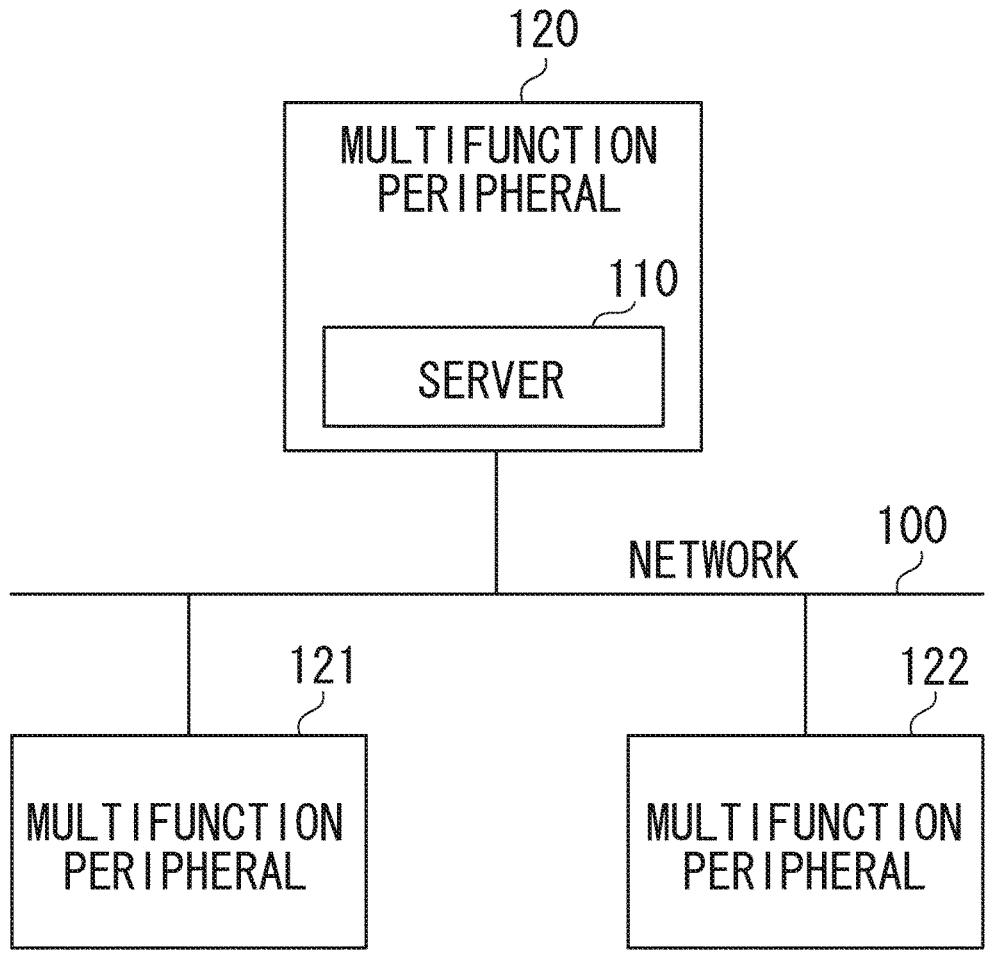
[Fig. 1B]
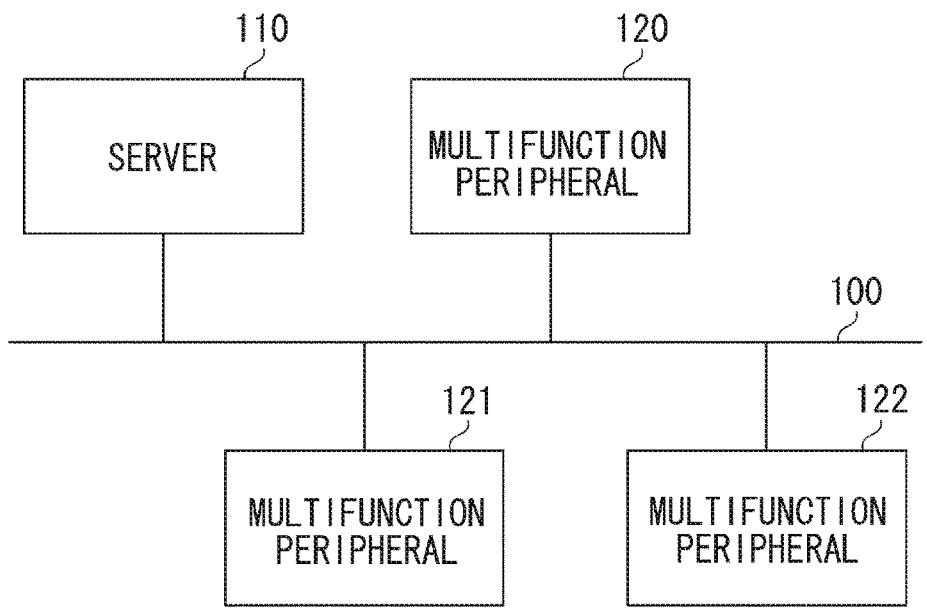

[Fig. 2]
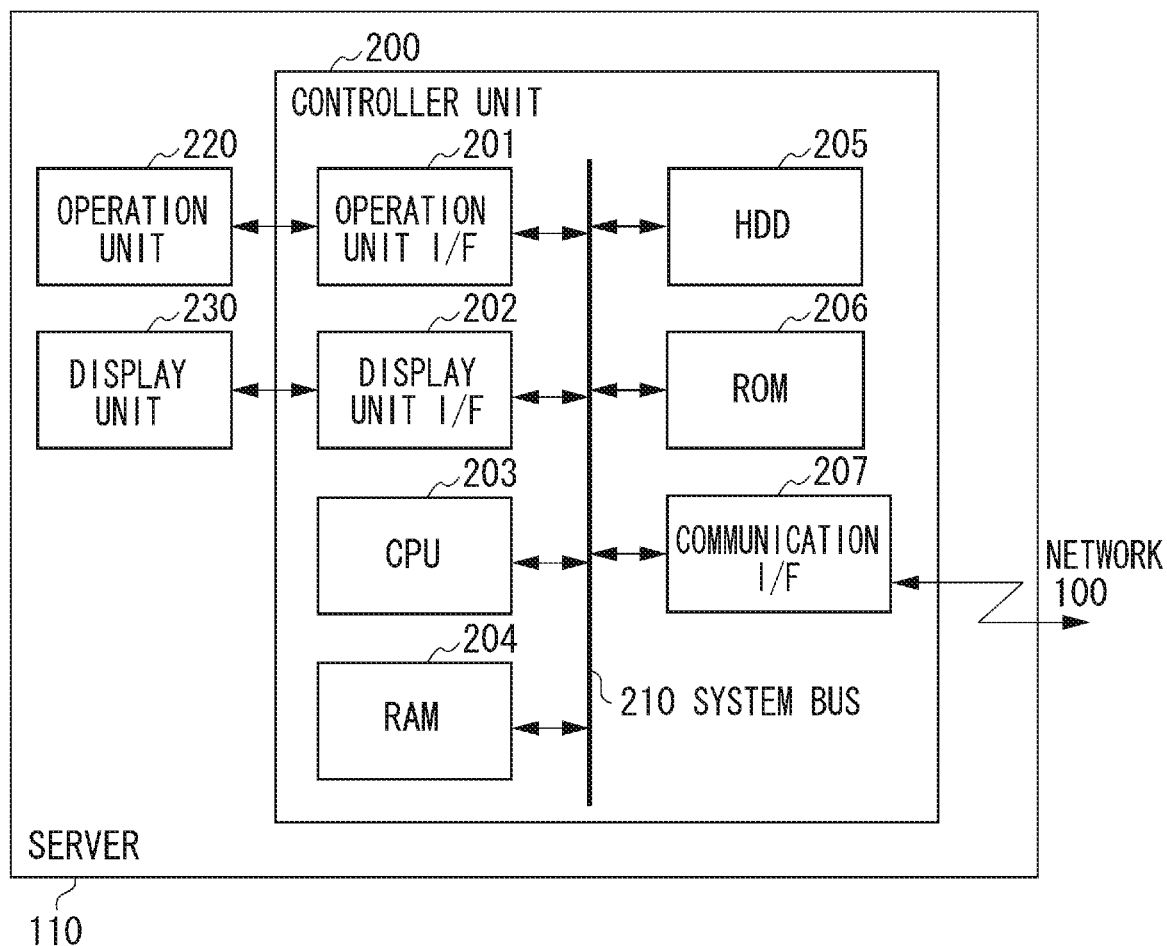

[Fig. 3]
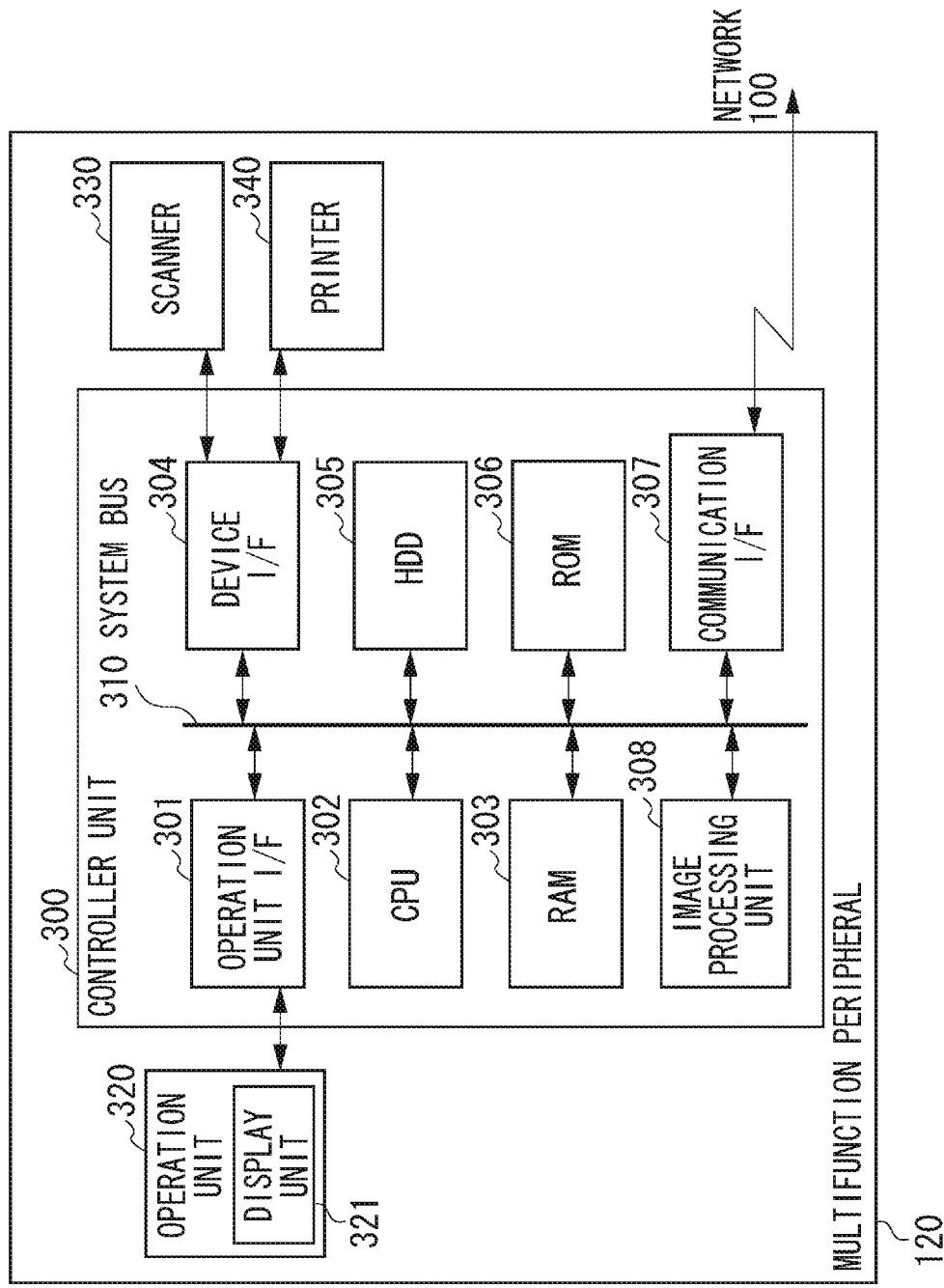

[Fig. 4]
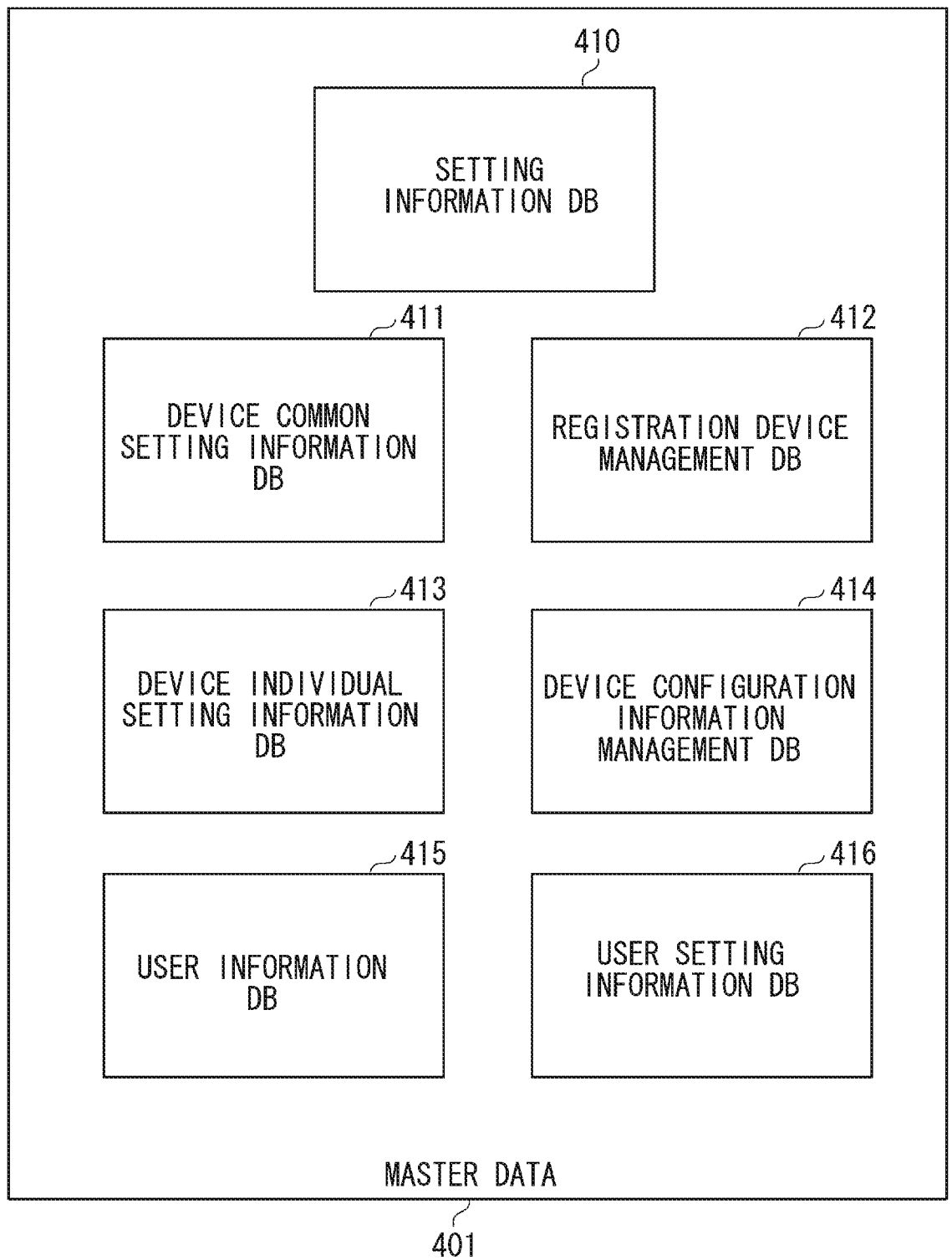

[Fig. 5]
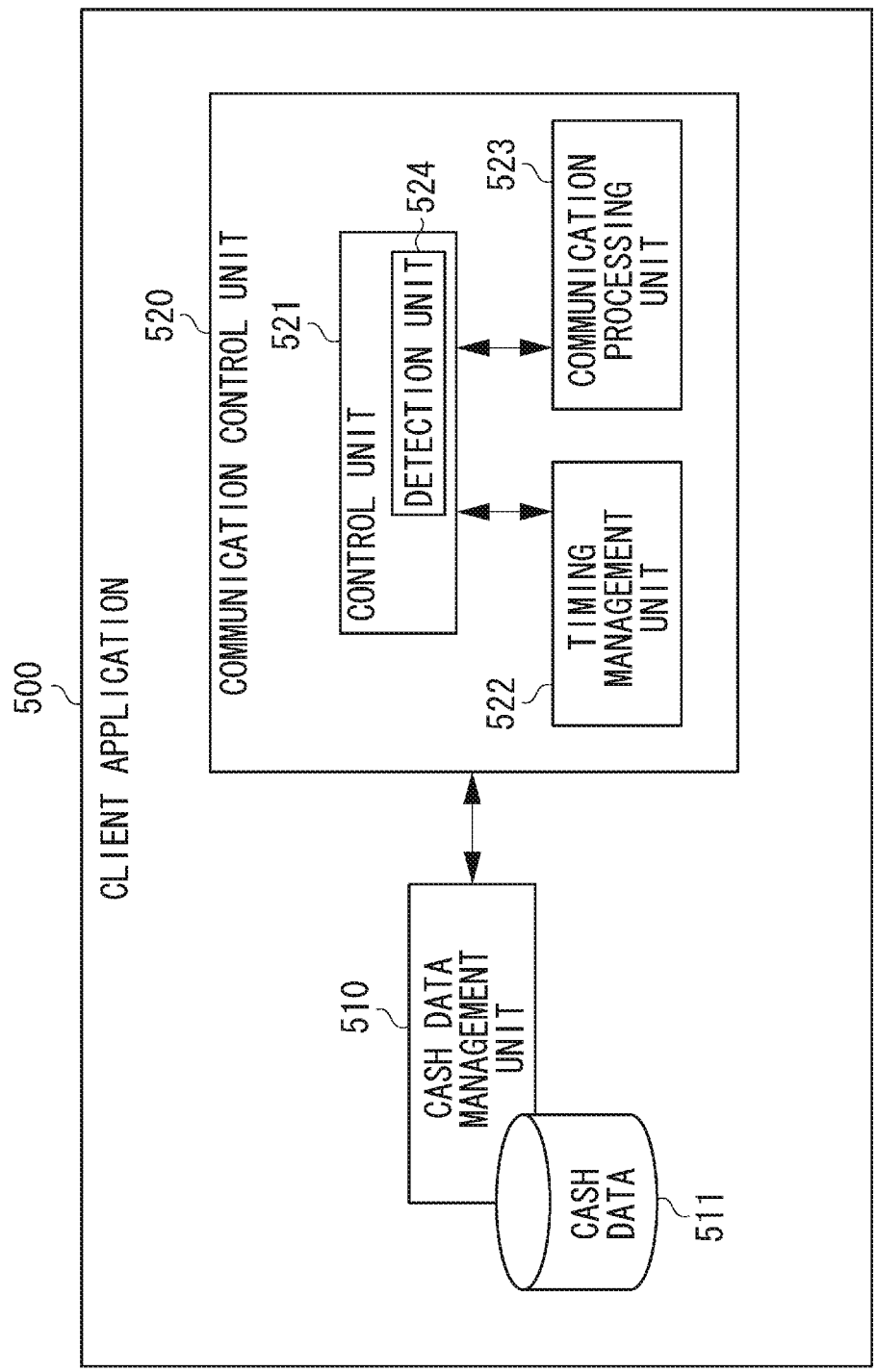

[Fig. 6]
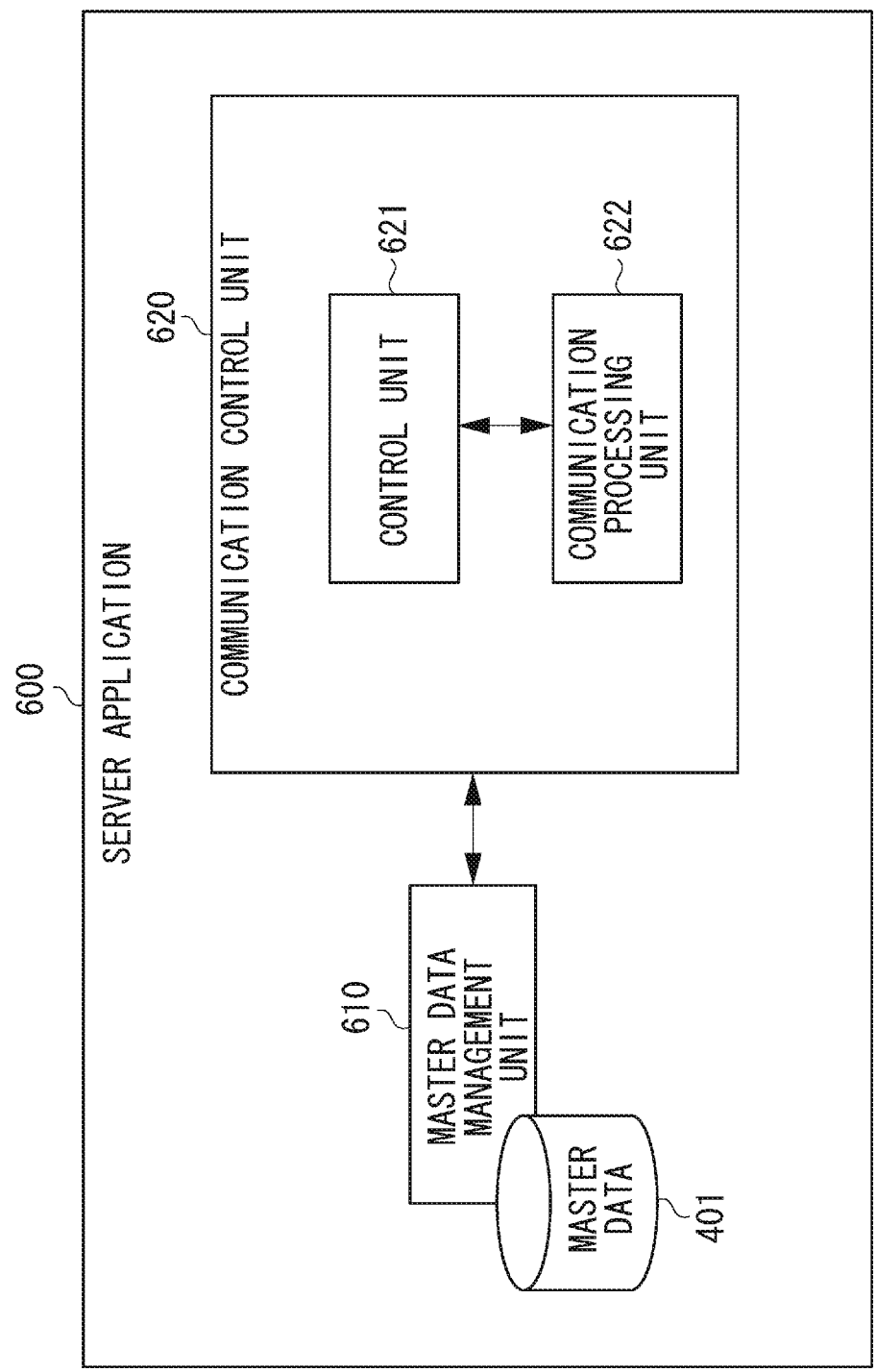

[Fig. 7]
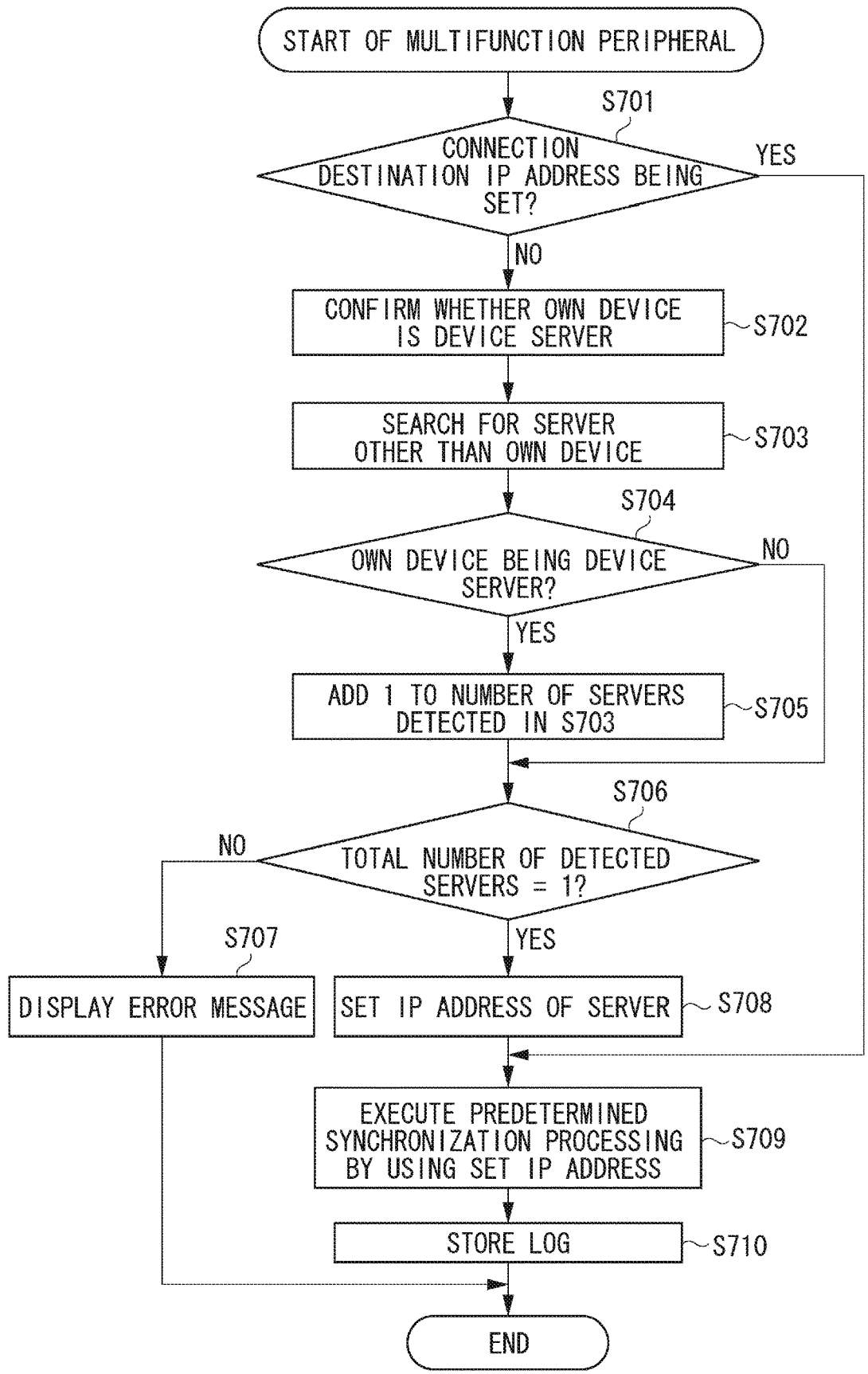

[Fig. 8]

| SETTING VALUE SYNCHRONIZATION LOG | | | | |
|---|---|---|---|---|
| LEVEL | DATE AND TIME | PROCESSING CONTENT | URL | METHOD |
| NORMAL | 2013/7/7/12:56 | DEVICE SETTING VALUE 2.1kB | https://123.456.789.012/dev_data | GET |
| ERROR | 2013/7/8/11:45 | DEVICE SETTING VALUE 2.1kB | https://123.456.789.012/dev_data | POST |

[Fig. 9]
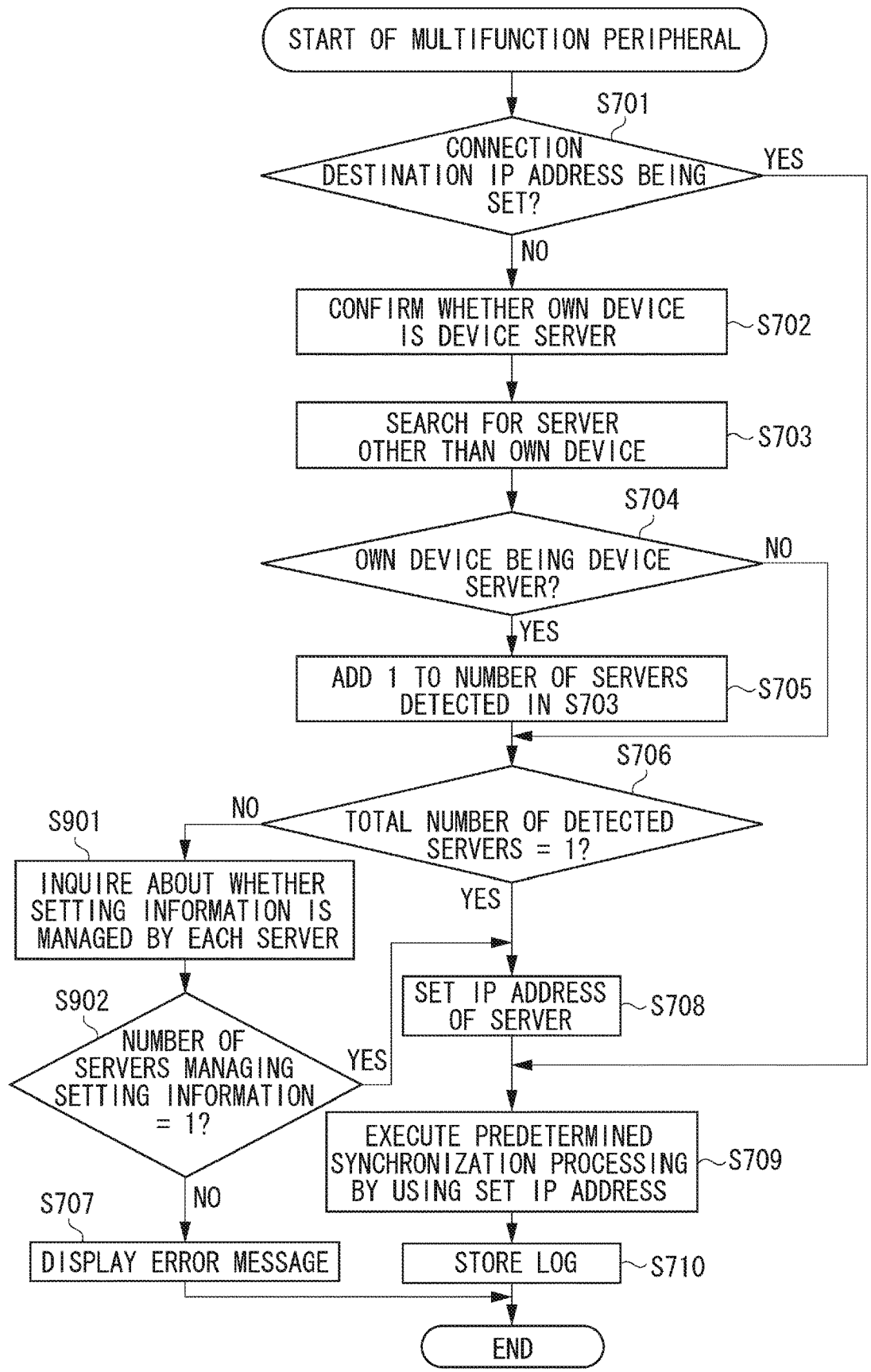

INFORMATION PROCESSING APPARATUS AND CONTROL METHOD FOR SYNCHRONIZING SETTING INFORMATION

TECHNICAL FIELD

The present invention relates to a synchronization technology for synchronizing setting information to be used for operation of an information processing apparatus, by using network communication between a client and a server.

BACKGROUND ART

Systems for sharing data between information processing apparatuses have been conventionally known. For example, a server discussed in PTL 1 stores update content of a database as an update history. The server transmits this update history to a client, thereby making data stored in the server and data stored in the client match with each other.

Further, PTL 2 discusses a synchronization system for transmitting content of data, which is updated after previous data synchronization between a server and a client, from the client to the server.

Furthermore, technologies for enabling a client device to search for a server present on a network have been conventionally known. PTL 3 discusses making a search for a device connected to a network. PTL 3 also discusses a device having both a client function and a server function.

In the system discussed in each of PTL 1 and PTL 2, the server is configured to manage setting information of a plurality of devices. In such a configuration, if the device searches for the server as discussed in PTL 3, the following problem may arise.

Assume that, as a result of the search for the server by the device, a plurality of servers is detected on the network, and the device enables an arbitrary one of the plurality of servers to manage the setting information. In this case, different servers may manage the setting information of each device. Therefore, uniform management of the setting information is prevented, which is the problem.

If the setting information is not uniformly managed, the management of the setting information may become complicated to increase the workload of the entire system, or inconsistency of the setting information stored in each device may readily occur.

CITATION LIST

Patent Literature

PTL 1: Japanese Patent Application Laid-Open No. 2004-86800
PTL 2: Japanese Patent Application Laid-Open No. 2004-94294
PTL 3: Japanese Patent Application Laid-Open No. 2005-157612

SUMMARY OF INVENTION

Solution to Problem

According to an aspect of the present invention, an information processing apparatus according to an exemplary embodiment of the present invention has the following configuration. The information processing apparatus includes a storage unit configured to store setting information of the information processing apparatus, a detection unit configured to detect a number of servers each of which manages at least setting information stored in other apparatuses, among apparatuses including the information processing apparatus and an apparatus connected to the information processing apparatus via a network, and a processing unit configured to start processing for causing, in a case where the number of servers detected by the detection unit is one, a server corresponding to the one to manage the setting information stored in the storage unit, and configured not to start the processing in a case where the number of servers detected by the detection unit is two or more.

Further features of the present invention will become apparent from the following description of exemplary embodiments with reference to the attached drawings.

According to the above-described configuration, setting information can be uniformly managed by a server in a synchronization system.

BRIEF DESCRIPTION OF DRAWINGS

FIG. 1A is a system configuration diagram illustrating an entire synchronization system.

FIG. 1B is a system configuration diagram illustrating an entire synchronization system.

FIG. 2 is a block diagram illustrating a configuration of a server.

FIG. 3 is a block diagram illustrating a configuration of a multifunction peripheral.

FIG. 4 is a configuration diagram of master data managed by the server.

FIG. 5 is a software configuration diagram of the multifunction peripheral in the synchronization system.

FIG. 6 is a software configuration diagram of the server.

FIG. 7 illustrates a flow of a processing procedure of the multifunction peripheral.

FIG. 8 is a diagram illustrating an example of log information to be record in the multifunction peripheral.

FIG. 9 illustrates a flow of a processing procedure of the multifunction peripheral.

DESCRIPTION OF EMBODIMENTS

Exemplary embodiments of the present invention will be described below with reference to the drawings. The exemplary embodiments to be described below are not intended to limit the invention according to the scope of claims, and not all combinations of features to be described in the exemplary embodiments are necessary for a solution to the invention.

First Exemplary Embodiment

FIGS. 1A and 1B each illustrate a configuration diagram of a synchronization system in a first exemplary embodiment. In an example illustrated in FIG. 1A, a plurality of multifunction peripherals 120, 121, and 122 is connected to a network 100, and a server 110 is present inside the multifunction peripheral 120. In an example illustrated in FIG. 1B, the server 110 and the plurality of multifunction peripherals 120, 121, and 122 are connected to the network 100. The synchronization system in the present exemplary embodiment can have either of the configuration illustrated in FIG. 1A and the configuration illustrated FIG. 1B. The multifunction peripherals 120, 121, and 122 are each an information processing apparatus that operates as a client of the server 110. The multifunction peripherals 120, 121, and 122 may each be hereinafter referred to as a device.

The server 110 manages master data of setting information of the multifunction peripherals 120, 121, and 122. When the master data stored in the server 110 is updated, the server 110 notifies the multifunction peripherals 120, 121, and 122 of information indicating the content of the update (hereinafter may be referred to as update information) via the network 100. The update information notified to the multifunction peripheral 120 by the server 110 is, for example, a difference between the setting information previously synchronized between the server 110 and the multifunction peripheral 120 and the setting information after the update in the server 110. This holds true for update information between the server 110 and each of the multifunction peripherals 121 and 122. Synchronously sharing the common setting information between the server 110 and the multifunction peripheral 120, 121 or 121 may be hereinafter expressed as synchronizing the setting information between the server 110 and the multifunction peripheral 120, 121 or 121.

Further, the server 110 updates a value of the master data, when receiving the update information of the setting information from the multifunction peripherals 120, 121, and 122.

The multifunction peripherals 120, 121, and 122 are devices that each implement one or more kinds of functions, e.g., copying and facsimile, and each store therein setting information to be used for execution of these functions. When the setting information is updated, the multifunction peripheral 120 notifies the server 110 of update information. This update information is, for example, a difference between the setting information previously synchronized between the server 110 and the multifunction peripheral 120, and the setting information after the update in the multifunction peripheral 120.

Further, when receiving the update information of the master data of the setting information from the server 110, the multifunction peripherals 120, 121, and 122 each update the setting information stored therein, by using the received update information.

With such a configuration, it is possible to store the common setting information shared among the server 110 and the multifunction peripherals 120, 121, and 122.

For example, as for the setting information to be used by all the multifunction peripherals 120, 121, and 122, when the master data on the server 110 is updated, the server 110 notifies each of the multifunction peripherals 120, 121, and 122 of the update information of the setting information. In this way, the setting information stored in the server 110 and the setting information stored in each of the multifunction peripherals 120, 121, and 122 are synchronized.

Further, when the setting information of any of the multifunction peripherals 120, 121, and 122 is updated, the multifunction peripheral in which the setting information is updated, e.g., the multifunction peripheral 120, notifies the server 110 of the update information. The server 110 updates the master data by using the received update information. Upon updating the master data, the server 110 notifies the multifunction peripherals 121 and 122 of update content as the update information. In this way, it is possible to keep storing the setting information common to the server 110 and the multifunction peripherals 120, 121, and 122.

Next, a configuration of the server 110 when the server 110 is configured as a standalone server as illustrated in FIG. 1B will be described using a block diagram illustrated in FIG. 2. The server 110 includes a controller unit 200, an operation unit 220, and a display unit 230.

The controller unit 200 includes a central processing unit (CPU) 203. The CPU 203 reads out a boot program stored in a read only memory (ROM) 206, and executes the read-out boot program, thereby starting an operating system (OS).

On this OS, the CPU 203 executes an application program stored in a hard disk drive (HDD) 205, thereby executing various kinds of processing. A random access memory (RAM) 204 is used as a work area of the CPU 203.

The HDD 205 stores the above-described application program and the master data of the setting information of the multifunction peripheral 120. A method for managing the master data will be described in detail below.

In addition to the ROM 206 and the RAM 204, an operation unit interface (I/F) 201, a display unit I/F 202, and a communication I/F 207 are connected to the CPU 203 via a system bus 210.

The operation unit I/F 201 is an interface with the operation unit 220. The operation unit 220 can be, for example, a mouse or keyboard. The operation unit I/F 201 notifies the CPU 203 of information input by a user using the operation unit 220.

The display unit I/F 202 outputs image data to the display unit 230. The display unit 230 can be, for example, a display. Further, the communication I/F 207 is connected to the network 100, and inputs/outputs information to/from each device on the network 100 via the network 100.

Next, a configuration of the multifunction peripheral 120 according to the present exemplary embodiment will be described using a block diagram illustrated in FIG. 3. The multifunction peripheral 120 according to the present exemplary embodiment includes a controller unit 300, an operation unit 320, a scanner 330, and a printer 340. The operation unit 320 is connected to the controller unit 300. The scanner 330 serving as an image input device and the printer 340 serving as an image output device are also connected to the controller unit 300.

The controller unit 300 includes a CPU 302. The CPU 302 reads out a boot program stored in a ROM 306, and executes the read-out boot program, thereby starting an OS. On this OS, the CPU 302 executes an application program stored in a HDD 305, thereby executing various kinds of processing. A RAM 303 is used as a work area of the CPU 302. In addition, besides providing the work area, the RAM 303 provides an image memory region for temporarily storing image data. The HDD 305 stores the above-described application program and image data, as well as various kinds of setting information. The setting information is used, for example, for enabling the CPU 302 to control operation of the scanner 330 or the printer 340. A method for managing the setting information in the multifunction peripheral 120 will be described below.

The ROM 306, the RAM 303, an operation unit I/F 301, a device I/F 304, a communication I/F 307, and an image processing unit 308 are connected to the CPU 302 via a system bus 310.

The operation unit I/F 301 is an interface with the operation unit 320, and outputs image data, which is to be displayed on a display unit 321 of the operation unit 320, to the operation unit 320. The operation unit 320 can be, for example, a touch panel. Further, the operation unit I/F 301 sends out information, which is input by a user using the operation unit 320, to the CPU 302.

The scanner 330 and the printer 340 are connected to the device I/F 304. The scanner 330 generates image data by reading an image. The image read by the scanner 330 includes a photograph, a picture, or a character. The printer 340 performs print processing for forming an image on a sheet. The CPU 302 controls the scanner 330 and the printer 340 via the device I/F 304.

The communication I/F 307 is connected to the network 100, and inputs/outputs information to/from each device on the network 100 via the network 100. The image processing unit 308 performs processing for an image input from the scanner 330, processing for an image to be output to the printer 340, and processing such as image rotation, image compression, resolution conversion, color space conversion, and gradation conversion.

The multifunction peripheral 121 and the multifunction peripheral 122 each have a configuration similar to the configuration described using FIG. 3. In the system configuration described using FIG. 1A, the server 110 and the multifunction peripheral 120 form the same device, and the hardware configuration described using FIG. 2 and the hardware configuration described using FIG. 3 are formed as one. In other words, the server 110 operates using the hardware configured in the multifunction peripheral 120. The multifunction peripheral 120 functions as a server for managing setting values of other device, by executing a server application 600.

Next, a configuration of the master data managed by the server 110 according to the present exemplary embodiment will be described using a block diagram illustrated in FIG. 4.

Master data 401 according to the present exemplary embodiment includes databases (hereinafter may each be referred to as DB). Specifically, the master data 401 includes a setting information DB 410, a device common setting information DB 411, a registration device management DB 412, a device individual setting information DB 413, a device configuration information management DB 414, a user information DB 415, and a user setting information DB 416.

The setting information DB 410 is a database for storing metadata about each piece of setting information managed in the server 110. Table 1 represents an example of the data stored in the setting information DB 410. The setting information DB 410 stores text to be presented to a user, a key identifier for distinguishing the setting information in communication with the multifunction peripheral 120, an initial value, a range, an applicable type/version, and a display condition of the setting information. As for each piece of the setting information managed in the setting information DB 410, presence/absence of the setting information and information such as the range and the initial value of the setting information may vary depending on the type of the multifunction peripheral 120 and the version of firmware.

In the example represented by Table 1, the setting information corresponding to the key identifier expressed as "settings.pattern" is present in all individuals in a type A and a type B. However, this setting information is present only in individuals of a firmware version 3.01 or later in a type C. Further, in the example represented by Table 1, as for the setting information corresponding to the key identifier expressed as "settings.density", the range and the initial value of the setting information vary depending on the version of installed firmware in the type B. The pieces of setting information following "settings.density" illustrated in Table 1 indicate that these pieces of setting information have the same initial values and the same ranges irrespective of the type and the firmware version.

TABLE 1

| KEY IDENTIFIER | UI DISPLAY TEXT | INITIAL VALUE | RANGE | APPLICABLE TYPE/FIRMWARE VERSION | DISPLAY CONDITION |
|---|---|---|---|---|---|
| settings.pattern | Background pattern printing | 0 | 0-1 | Type A/ALL Type B/ALL Type C/V3.01 or later | Background Pattern license |
| settings.density | Print density | 5 | 0-10 | Type A/ALL Type B/V2.01 or later | — |
| settings.density | Print density | 3 | 0-6 | Type B/V1.01 or later Type C/ALL | — |
| settings.my_jp_address | IP address of own device | " " | Character string | ALL | — |
| settings.server_jp_address | IP address of synchronization destination server | " " | Character string | ALL | — |

The device common setting information DB 411 is a database for managing the setting information currently shared by all the multifunction peripherals managed by the server 110. Table 2 represents an example of the data stored in the device common setting information DB 411. The device common setting information DB 411 stores a key identifier, a value corresponding to the key identifier, and a last update date and time of the setting information. The system of this key identifier is the same as that of the key identifier in the setting information DB 410. As illustrated in Table 1, the range and the initial value of "settings.density" vary depending on the type of the device. However, as illustrated in the example represented by Table 2, the value of "settings.density" in each of all the devices in the system is set to 0.

TABLE 2

| KEY IDENTIFIER | VALUE | LAST UPDATE DATE AND TIME |
|---|---|---|
| settings.density | 0 | 2013/9/9/12:01 |
| settings.sleep_time | 3600 | 2013/9/8/17:35 |

The registration device management DB 412 is a database for managing an individual identifier of the multifunction peripheral for which the server 110 manages the setting information.

The device individual setting information DB 413 is a database for managing the setting information indicating values that vary among a plurality of multifunction peripherals managed by a server. Table 3 represents an example of the data stored in the device individual setting information DB 413. The plurality of device individual setting information DBs 413 are assumed to be present for the individuals corresponding to the respective multifunction peripherals. The device individual setting information DB 413 stores a key identifier, a value corresponding to the key identifier, and a last update date and time of the setting information. The system of this key identifier is the same as that of the key identifier in the setting information DB 410.

TABLE 3

| KEY IDENTIFIER | VALUE | LAST UPDATE DATE AND TIME |
|---|---|---|
| settings.pattern | 1 | 2013/5/9/16:42 |
| settings.my_jp_address | "123.456.789.012" | 2013/6/18/17:43 |
| settings.server_jp_address | "123.456.789.012" | 2013/7/7/12:55 |

The device configuration information management DB 414 includes information such as an individual identifier for identifying an individual corresponding to the multifunction peripheral 120, a type name, a version of firmware, license information representing available function, and information of a device added as an accessory. Table 4 represents an example of the device configuration information of an individual corresponding to each multifunction peripheral managed in the device configuration information management DB 414. The system of the information such as the type name, the version of firmware, and the license is the same as that of the information stored in the setting information DB 410. The device configuration information management DB 414 is shared between the multifunction peripheral 120 and the server 110, by being notified to the server 110 by the multifunction peripheral 120. The multifunction peripheral 120 can notify the server 110 of update content of its own device configuration information. On the other hand, on the server 110, the content of the device configuration of the multifunction peripheral 120 cannot be changed. In addition, the device configuration information of a certain device is shared only between this device and the server 110, and is not notified to other device.

TABLE 4

| ATTRIBUTE | VALUE |
|---|---|
| Individual identifier | Individual 1 |
| Type name | Type A |
| Firmware version | 0.01 |
| Installed license | Background pattern license |
| Accessory | Finisher-X |

The user information DB 415 is a database for managing information about a user using the multifunction peripheral 120. Table 5 represents an example of the data stored in the user information DB 415. The user information DB 415 stores information such as a user ID for uniquely identifying a user and a user name to be input by the user at the time of login.

TABLE 5

| USER ID | USER NAME | FIRST NAME | LAST NAME |
|---|---|---|---|
| 501 | Sato | Takashi | Sato |
| 502 | Ii | Ryoko | Ii |

The user setting information DB 416 is a database for managing the setting information for each user, which is information available for the corresponding user using the multifunction peripheral 120. Table 6 represents an example of the data stored in the user setting information DB 416. The user setting information DB 416 stores a user ID for uniquely identifying a user, a key identifier for uniquely identifying setting information, content of the setting information, and a last update date and time of the setting information. The system of this user ID is the same as that in the user information DB 415.

TABLE 6

| USER ID | KEY IDENTIFIER | VALUE | LAST UPDATE DATE AND TIME |
|---|---|---|---|
| 501 | preference.print_setting1 | [colormode: "BW", copies: "3"] | 2013/2/4/2:01 |
| 501 | preference.Print_setting2 | [colormode: "CL, quality: "Low"] | 2013/2/3/7:35 |
| 501 | preference.address1 | [destination: "sato@canon.com"] | 2013/8/30/3:01 |
| 501 | preference.address2 | [destination: "user1@canon.com"] | 2013/1/13/2:16 |

Using each of the above-described databases of the master data 401, the server 110 collectively manages the setting information varying for each of the multifunction peripherals 120 being managed, the setting information common to all the multifunction peripherals being managed, and the metadata of each piece of the setting information itself.

Next, FIG. 5 illustrates a block configuration diagram of application software for management of setting data, which is software that operates in each of the multifunction peripherals 120, 121, and 122, in the synchronization system according to the present exemplary embodiment. A client application 500 includes a cash data management unit 510 and a communication control unit 520. The cash data management unit 510 manages cash data 511 of the multifunction peripheral 120. The communication control unit 520 includes a plurality of blocks, and controls communication performed via the communication I/F 307. In the present exemplary embodiment, the client application 500 is stored in a storage unit that is any of the RAM 303, the HDD 305, and the ROM 306, and executed by the CPU 302.

The cash data 511 managed by the cash data management unit 510 is stored in a storage unit such as the HDD 305 and the RAM 303. The communication control unit 520 includes a control unit 521, a timing management unit 522, and a communication processing unit 523.

The multifunction peripheral 120 stores a setting value in the cash data 511. The cash data 511 is a database stored in the HDD 305 of the multifunction peripheral 120. Table 7 represents an example of a configuration of the cash data 511. The setting information stored in the cash data 511 includes elements such as a key identifier for identifying the setting information, a value of the setting information, UI display text, an initial value, a range, an applicable type/firmware version, and a display condition. These elements are managed in the same system as those managed in the master data 401. When the setting information is updated in the server 110 or the multifunction peripheral 120, the setting information is synchronized by communicating at least the key identifier and the value among the data illustrated in Table 7.

TABLE 7

| KEY IDENTIFIER | UI DISPLAY TEXT | INITIAL VALUE | RANGE | APPLICABLE TYPE/FIRMWARE VERSION | DISPLAY CONDITION |
|---|---|---|---|---|---|
| settings.pattern | Background pattern printing | 0 | 0-1 | Type A/ALL Type B/ALL Type C/V3.01 or later | Background Pattern license |
| settings.density | Print density | 5 | 0-10 | Type A/ALL Type B/V2.01 or later | — |
| settings.density | Print density | 3 | 0-6 | Type B/V1.99 or before Type C/ALL | — |
| settings.my_jp_address | IP address of own device | " " | Character string | ALL | — |
| settings.server_jp_address | IP address of synchronization destination server | " " | Character string | ALL | — |

Synchronization processing for each piece of the above-described setting information is performed by communication between the communication I/F 207 of the server 110 and the communication I/F 307 of the multifunction peripheral 120 via the network 100.

The control unit 521 controls the synchronization processing for the setting information with the server 110. The synchronization processing for the setting information is processing for allowing the server 110 and the multifunction peripheral 120, 121, or 122 to share the setting information. The timing management unit 522 manages synchronization timing for the setting data. The control unit 521 includes a detection unit 524 for detecting the number of servers among a plurality of devices connected to the network 100. The plurality of devices to be detected by the detection unit 524 include the own device.

The communication processing unit 523 performs processing for communication with the server application 600 to be described below, via the communication I/F 307. Details of processing to be performed by each processing unit will be described below.

The cash data management unit 510 receives update information acquired from the server 110 by the communication control unit 520 to be described below, from the communication control unit 520, and performs processing for reflecting the received update information on the cash data 511. Further, when information of the cash data 511 is updated in the multifunction peripheral 120, the cash data management unit 510 requests the communication control unit 520 to reflect the update information on the master data 401 managed by the server 110.

The communication control unit 520 controls communication for synchronizing the setting information with the server 110. The timing management unit 522 determines acquisition timing for periodically acquiring the update information of the master data 401 from the server 110. Further, the control unit 521 receives the update information of the master data 401 acquired from a server by the communication processing unit 523, and requests the cash data management unit 510 to reflect the update information.

FIG. 6 is a block configuration diagram of server application software that operates in the server 110, in the synchronization system according to the present exemplary embodiment. In the present exemplary embodiment, the server application 600 is stored in a storage unit, which is any of the RAM 204, the HDD 205, and the ROM 206, and executed by the CPU 203. The server application 600 includes a master data management unit 610 and a communication control unit 620. The server 110 functions as a server for managing setting values of other device, by executing the server application 600.

The master data management unit 610 manages the master data 401 described above. The master data 401 managed by the master data management unit 610 is stored in a storage unit such as the HDD 205 and the RAM 204.

The master data management unit 610 performs control for updating the setting information stored in the master data 401, by using the update information received by the communication control unit 620 from the multifunction peripherals 120, 121, and 122. Further, assume that a request for acquiring the update information of the master data 401 is received by the communication control unit 620 from any of the multifunction peripherals 120, 121, and 122. The master data management unit 610 then performs operation for creating the update information to be transmitted to this multifunction peripheral, and notifying the communication control unit 620 of the created update information. In this way, the server application 600 at least manages the setting information stored in other device. In a case where the own device stores the server application 600 and the client application 500 as with the multifunction peripheral 120 illustrated in FIG. 1A, the server application 600 also manages the setting information stored by the client application 500 of the own device.

The communication control unit 620 controls communication with the client application 500 via the communication I/F 207. The communication control unit 620 controls synchronization of the setting information with the multifunction peripherals 120, 121, and 122.

The communication control unit 620 includes a control unit 621 and a communication processing unit 622. The control unit 621 controls the synchronization processing for the setting information with the multifunction peripherals 120, 121, and 122. When the update information of the setting information is received by the communication processing unit 622 from any of the multifunction peripherals 120, 121, and 122, the control unit 621 notifies the master data management unit 610 of this update information of the setting information. Further, assume that a request for acquiring the update information is received by the communication processing unit 622 from any of the multifunction peripherals 120, 121, and 122. The control unit 621 then performs operation for acquiring the update information of this multifunction peripheral from the master data management unit 610, and instructing the communication processing unit 622 to transmit the acquired update information to this multifunction peripheral.

The communication processing unit 622 performs processing for communication with the client application 500 via the communication I/F 207.

Next, processing to be executed by the client application 500 will be described using a flowchart illustrated in FIG. 7. The processing illustrated in FIG. 7 is processing from start of the multifunction peripheral 120, 121, or 122 to start of the synchronization processing for the setting information with the server 110 following connection of this multifunction peripheral with the server 110. An example in which the processing is executed in the multifunction peripheral 120 will be described below. However, the same processing is executed in each of the multifunction peripherals 121 and 122. The flowchart illustrated in FIG. 7 will be described below using a case where this flowchart begins based on the start of the multifunction peripheral 120, 121, or 122, but is not limited to this case. This flowchart may begin when an instruction for executing the processing in the flowchart illustrated in FIG. 7 is provided by a user. Alternatively, the processing illustrated in FIG. 7 may be triggered by execution of processing other than the start in the multifunction peripheral 120, 121, or 122.

The CPU 302 of the multifunction peripheral 120 executes each procedure of the flowchart illustrated in FIG. 7. A series of processes to be illustrated in this flowchart begins, for example, in response to a press of a power button (not illustrated) in the operation unit 320 of the multifunction peripheral 120. A start process of the multifunction peripheral 120 begins, for example, in response to a press of the power button. Examples of a condition for starting the processing illustrated in FIG. 7 include a case where a function of synchronizing the setting information is enabled and a case where the server 110 is enabled in the multifunction peripheral 120 operating as a device for synchronizing the setting information, but are not limited to these cases.

First, in step S701, the control unit 521 determines whether an Internet Protocol (IP) address of a connection destination server is set. In the present exemplary embodiment, the IP address of the connection destination server is stored as the setting information in the HDD 305. When the IP address of the connection server is not set (NO in step S701, the processing proceeds to step S702. On the other hand, when the IP address of the connection destination server is set (YES in step S701), the processing proceeds to step S709. In step S709, the synchronization processing for the setting information with the server begins. When the address information for communicating with the server application 600 is thus set in the multifunction peripheral 120, processing for causing management of the setting information is performed. Specifically, the processing begins to cause the server application 600 corresponding to the address information to manage the setting information stored in the multifunction peripheral 120, regardless of the number of servers on the network 100.

In step S702, the control unit 521 confirms whether the own device is a device server. Here, a device, which has a function of serving as the server 110 and a function of serving as a client, as with the multifunction peripheral 120 illustrated in FIG. 1A, may be referred to as "device server". The client application 500 described using FIG. 5 and the server application 600 using FIG. 6 operate in the device server. The multifunction peripheral 120 serving as the server 110 manages the setting values of the multifunction peripherals 120, 121, and 122 each serving as a client. Both the server application 600 and the client application 500 start in response to the start of the multifunction peripheral 120.

Examples of a method performed in step S702 include a method for determining that the own device is a device server, when there is a response from the server 110 to a predetermined search packet transmitted from the communication processing unit 523 by specifying the IP address of the own device. For example, Hypertext Transfer Protocol (HTTP) can be used as a communication protocol for transmitting the packet. Alternatively, the multifunction peripheral 120 may store beforehand information indicating that the multifunction peripheral 120 itself functions as a server, and may perform the process in step S702 by confirming this information. Still alternatively, the server application 600 may notify the client application 500 present in the same device. This notification indicates that the server application 600 is present in the same device where the client application 500 operates. The determination method in step S702 is limited neither to the above-described examples nor to any method in particular. In the example illustrated in FIG. 1A, the multifunction peripheral 120 is the device server having the server function, and therefore, whether the own device is a device server is determined in step S702. When the own device is a device server, for example, a flag indicating that the multifunction peripheral is a device server can be stored in the storage unit. After execution of the processing in step S702, the processing proceeds to step S703.

In step S703, the control unit 521 searches for a server present on the network. One of conceivable search methods is to make a search for finding a server responding to a multi-cast packet. In this method, the communication processing unit 523 is requested to send out the multi-cast packet within a local area network (LAN) by using Service Location Protocol (hereinafter may be referred to as SLP). In the search using SLP, a device that is the origin of a message is not detected. In other words, in the search using SLP, the multifunction peripheral is not detected as a server in step S703, even if the multifunction peripheral is a device server having a server function. The method for searching for a server is limited neither to the above-described method nor to any method in particular. The process in step S702 and the process in step S703 may be replaced with each other, in terms of the processing sequence. In other words, the process in step S702 may be executed after execution of the process in step S703, when the result of the determination is NO in step S701. After the control unit 521 executes the process in step S702 and the process in step S703, the processing proceeds to a process in step S704.

In step S704, it is determined whether the own device is a device server, based on the confirmation result in step S702. For example, whether the own device is a device server can be determined by determining whether a flag indicating that the own device is a device server is set as a result of the process in step S702. A determination method thereof is limited neither to this method nor to any method in particular. The control unit 521 thus determines whether the own device is a server.

When the own device is a device server (YES in step S704), the processing proceeds to step S705. On the other hand, when the own device is not a device server (NO in step S704), the processing proceeds to step S706. In the configuration illustrated in FIG. 1A, the multifunction peripheral 120 is a device server having a server function and therefore, the processing proceeds to step S705. On the other hand, none of the multifunction peripheral 121 and the multifunction peripheral 122 is a device server and therefore, the processing proceeds to step S706.

In step S705, 1 is added to the number of servers detected in step S703. As described above, in the present exemplary embodiment, the number of servers other than the own device is detected in step S703. Therefore, in a case where the own device has a server function, the total number of servers in the system can be acquired by adding 1 to the number of servers detected in step S703. After execution of the process in step S705, the processing proceeds to step S706.

The detection unit 524 of the control unit 521 can detect the number of servers, among devices including the own device and a device connected to the own device via the network, by executing the processes in step S702 to step S705.

In the present exemplary embodiment, the process for determining whether the own device is a server and the process for detecting the number of servers other than the own device are separately executed in the processes in step S702 to step S705. However, this is only an example, and the way of executing these processes is not limited to this example. The total number of servers in the system may be detected by one process, by including the own device as a detection target.

In step S706, the control unit 521 determines whether the total number of servers detected in step S702 and step S703 is one. When the total number of servers is one (YES in step S706), the processing proceeds to step S708. On the other hand, the total number of servers is zero, or two or more (NO in step S706), the processing proceeds step S707.

In step S707, the control unit 521 displays an error message on the display unit 321 of the operation unit 320. The error message may be changed according to the detected total number of servers. For example, when the total number of servers is zero, a message appears saying "server not found". Further, when the total number of servers is two or more, a message can appear saying "server not identified".

In this way, when the total number of devices detected as servers is two or more, the control unit 521 performs display control for causing the display unit 321 to display the message indicating that the setting value synchronization processing with the server is not to be started. Further, the control unit 521 performs display control for causing the display unit 321 to display a message different according to the detected number of devices. However, the method for displaying the error message is not limited to the above-described example. A common message may be displayed regardless of the detected number of servers. The control unit 521 ends the processing illustrated in FIG. 7, upon displaying the error message. In this way, the synchronization processing for the setting information with the server can be prevented from starting, when the number of devices detected as servers is zero, or two or more.

When the client application 500 cannot identify a server because a plurality of servers is detected, a user can select a server to be used, and manually set the selected server as a connection destination server in the multifunction peripheral 120. When a server cannot be identified, the control unit 521 may cause the display unit 321 of the operation unit 320 to display a setting screen to be used by the user to set a server manually, or may cause the operation unit 320 to display a shortcut to this setting screen.

In step S708, the control unit 521 sets the IP address of the detected server, as an address of a connection destination of the own device. For example, the control unit 521 requests the cash data management unit 510 to store the IP address of the detected server, as an IP address of a connection destination server. In this way, when the number of devices each detected as a server is one, the process for allowing the server application 600 to manage the setting information stored in the cash data 511 can be started in step S709. Upon being requested, the cash data management unit 510 stores the IP address of the detected server in the HDD 305, as the IP address of the connection destination server. After the execution of the process in step S708, the processing proceeds to step S709.

In step S709, the control unit 521 instructs the communication processing unit 523 to execute predetermined synchronization processing with the server application 600. Upon being instructed, the communication processing unit 523 starts the predetermined synchronization processing for the server application 600.

In the present exemplary embodiment, this synchronization processing is set to be executed for the server 110 at the start of each of the multifunction peripherals 120, 121, and 122. In this predetermined synchronization processing, each of the multifunction peripherals notifies the server 110 of the setting information to be stored in the cash data 511. The server 110 records the setting information acquired from each of the multifunction peripherals into the master data 401, and manages the recorded setting information. The synchronization thus begins between the setting information stored in the cash data 511 by each of the multifunction peripherals and the setting information stored in the master data 401 by the server 110.

After this synchronization processing is executed, the master data 401 and the cash data 511 are successively updated by exchange of the update information between the server 110 and each of the multifunction peripherals. In other words, when the setting information stored in the cash data 511 of the multifunction peripheral 120 is updated, the server application 600 is notified of the update information indicating the update content. Further, when the master data 401 of the server 110 is updated, the server 110 transmits the update information to the multifunction peripheral in response to an update confirmation request from the multifunction peripheral. The communication processing unit 523 notifies the control unit 521 of an execution result of the synchronization processing performed in step S709.

In step S710, the control unit 521 stores the execution result of the synchronization processing as log information in the HDD 305, upon receiving the execution result of the synchronization processing from the communication processing unit 523. FIG. 8 is a diagram illustrating an example of the log information stored in step S710. The log information of the present exemplary embodiment includes, for example, a level indicating success/failure of communication, a communication date and time, a processing content, a connection destination uniform resource locator (URL), and a type of access to target data. The level indicates "Normal" for success, "Warning" for failure due to a temporary factor, and "Error" for failure due to a permanent factor. The storage form of the log information described here is an example, and any other form may be adopted.

Completion of the execution of the process in step S710 ends the processing from the start of the multifunction peripheral 120 to the start of the synchronization processing following the connection to the server 110.

According to the present exemplary embodiment, when the number of servers in the system is one, the synchronization processing between the multifunction peripheral and the server 110 can be caused to begin automatically at the start of the multifunction peripheral 120, 121, or 122. Further, when the number of servers in the system is one, the synchronization processing between the multifunction peripheral and the server 110 can be prevented from automatically beginning at the start of the multifunction peripheral 120, 121, or 122.

In this way, the setting information of the multifunction peripherals connected to the system can be managed in a centralized manner by a single server represented by the server 110. Therefore, the processes for performing the synchronization processing between the server 110 and the multifunction peripherals 120, 121, and 122 can be prevented from being complicated, and the synchronization processing can be efficiently performed. In addition, it is possible to reduce the possibility of occurrence of inconsistency between the setting information stored in the server 110 and the setting information stored in the multifunction peripherals 120, 121, and 122.

The present exemplary embodiment is described using the example in which the server 110 and the multifunction peripheral 120 form the same device. However, the server 110 may be an independent server as illustrated in FIG. 1B.

Second Exemplary Embodiment

A second exemplary embodiment will be described using an example in which, even if a plurality of servers is detected when the multifunction peripheral is started and then connected to the server 110, synchronization processing between the started multifunction peripheral and the server 110 is caused to begin if the number of servers actually managing setting information is one.

In the present exemplary embodiment, system configurations, hardware configurations, software configurations, and data structures are similar to those described using FIG. 1 to FIG. 6 in the first exemplary embodiment. Therefore, the description thereof will be omitted, and only a point different from that of the first exemplary embodiment will be described.

In the present exemplary embodiment, the synchronization processing for the setting information to be performed by the multifunction peripheral 120 will be described using a flowchart illustrated in FIG. 9. FIG. 9 illustrates processing from start of the multifunction peripheral 120, 121, or 122 to start of the synchronization processing for the setting information with the server 110 following connection of the multifunction peripheral with the server 110. The flowchart illustrated in FIG. 9 will be described using a case where this flowchart begins based on the start of the multifunction peripheral 120, 121, or 122, but is not limited to this case. This flowchart may begin when an instruction for executing the processing in the flowchart illustrated in FIG. 9 is provided by a user. Alternatively, the processing illustrated in FIG. 9 may be triggered by execution of processing other than the start, in the multifunction peripheral 120, 121, or 122. The processing illustrated in FIG. 9 is to be executed by the client application 500. Although an example in which the multifunction peripheral 120 executes the processing will be described below, the multifunction peripherals 121 and 122 are each assumed to execute the same processing.

The CPU 302 of the multifunction peripheral 120 executes each procedure of the flowchart illustrated in FIG. 9. A series of processes illustrated in this flowchart begins at timing similar to that of the processes described using FIG. 7 in the first exemplary embodiment.

Upon start of the processing illustrated in FIG. 9, the control unit 521 executes the processes corresponding to the processes in step S701 to step S706 described using FIG. 7 in the first exemplary embodiment.

When the total number of servers detected in step S702 and step S703 is one (YES in step S706), the control unit 521 executes the processes in step S708 to step S710 in a manner similar to that in the first exemplary embodiment. On the other hand, when the total number of the detected servers is zero, or two or more (NO in step S706), the processing proceeds to step S901.

In step S901, the control unit 521 instructs the communication processing unit 523 to send an inquiry about whether the setting information of the multifunction peripheral in the system is currently managed, to each of the servers detected in step S702 and step S703. Upon being thus instructed, the communication processing unit 523 communicates with the server application 600, thereby inquiring about whether the setting information is currently managed, and receiving a response.

For example, the server 110 stores status information indicating whether the server 110 is in a state of managing the setting information. When receiving an inquiry from the client application 500, the server 110 responds to the client application 500 that has sent the inquiry, based on the status information. Alternatively, the client application 500 may acquire the status information, by transmitting a request for acquiring the status information to the server application 600 as the inquiry. However, the method of making the inquiry is not limited to these examples.

If the total number of servers detected in step S702 and step S703 is zero, the processing proceeds to step S902 without making an inquiry.

In step S902, the control unit 521 determines whether the total number of servers, which each have returned a response indicating the setting information being managed, to the inquiry sent in step S901, is one. In this way, it is determined whether the number of servers executing the management of the setting information stored in other device is zero, or two or more, among the multifunction peripheral 120 and the plurality of devices connected via the network 100. When the total number of servers, which each have returned a response indicating the setting information being managed, is one (YES in step S902), the processing proceeds to step S708. On the other hand, when this total number is zero, or two or more (NO in step S902), the processing proceeds to step S707. Afterward, the processes having the same contents as those described using FIG. 7 in the first exemplary embodiment are executed. In this way, when it is determined that the number of servers executing the management of the setting information stored in other device is one, the processing for causing this server application to manage the setting information of the multifunction peripheral 120 begins. Further, when it is determined that the number of servers executing the management of the setting information stored in other device is two or more, the display unit 321 is caused to display a message saying that the processing is not to be started.

According to the present exemplary embodiment, the processes for performing the synchronization processing between the server 110 and the multifunction peripherals 120, 121, and 122 can be prevented from being complicated, and the synchronization processing can be efficiently performed, as in the first exemplary embodiment. In addition, it is possible to reduce the possibility of occurrence of inconsistency between the setting information stored in the server 110 and the setting information stored in the multifunction peripherals 120, 121, and 122.

In addition, according to the present exemplary embodiment, even if a plurality of servers is detected when the multifunction peripheral is started and then connected to the server 110, the synchronization processing between the started multifunction peripheral and the server 110 is caused to begin if the number of servers actually managing the setting information is one.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)trademark), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-171259, filed Aug. 31, 2015, which is hereby incorporated by reference herein in its entirety.

The invention claimed is:

1. An information processing apparatus comprising:
a storage unit configured to store setting information of the information processing apparatus;
a memory device that stores a set of instructions; and
at least one processor that executes the set of instructions to:
detect a number of servers each of which manages at least setting information stored in other apparatus, among apparatuses connected to the information processing apparatus via a network;
determine whether or not the information processing apparatus is a server that manages the setting information stored in the other apparatus; and
control whether or not to start synchronization processing for synchronizing the setting information stored in the storage unit and the setting information stored in the server with each other based on a determination result of determining whether or not the information processing apparatus is a server that manages the setting information stored in the other apparatus and based on the number of servers each of which manages at least the setting information stored in the other apparatus among the apparatuses connected to the information processing apparatus via the network,
wherein, in the control,
if the determination result indicates that the information processing apparatus is not the server and further if the number of detected servers is one, the synchronization processing for synchronizing the setting information stored in the storage unit and the setting information stored in the server with each other is started,
if the determination result indicates that the information processing apparatus is the server and further if a sum of the number of detected servers and one is one, the synchronization processing for synchronizing the setting information stored in the storage unit and the setting information stored in the server with each other is started,
if the determination result indicates that the information processing apparatus is not the server and further if the number of detected servers is two, or three or more, neither of the two detected servers, or none of the three or more detected servers, starts the synchronization processing for synchronizing the setting information stored in the storage unit and the setting information stored in the server with each other,
if the determination result indicates that the information processing apparatus is the server and further if a sum of the number of detected servers and one is two, or three or more, the synchronization processing for synchronizing the setting information stored in the storage unit and the setting information stored in the server with each other is not started.

2. The information processing apparatus according to claim 1, wherein the at least one processor executes instructions in the memory device to:
in a case where address information for communicating with a server to be caused to manage the setting information stored in the storage unit is set in the information processing apparatus, start processing for causing a server corresponding to the address information to manage the setting information stored in the storage unit, regardless of the number of servers.

3. The information processing apparatus according to claim 1, wherein the at least one processor executes instructions in the memory device to:
cause a display unit to display a message indicating that the synchronization processing is not to be started, in a case where the number of detected servers is two or more.

4. The information processing apparatus according to claim 3, wherein the at least one processor executes instructions in the memory device to:
in a case where the number of detected servers is two or more, cause the display unit to display a message different according to the number of detected servers.

5. The information processing apparatus according to claim 1, wherein the at least one processor executes instructions in the memory device to:
   determine a number of servers each executing management of setting information stored in other apparatus, among apparatuses including the information processing apparatus and an apparatus connected to the information processing apparatus via a network; and
   in a case where it is determined that the number of servers each executing management of setting information stored in other apparatus is one, start synchronization processing for causing the server executing the management of the setting information to manage the setting information stored in the storage unit.

6. The information processing apparatus according to claim 5, wherein the at least one processor executes instructions in the memory device to:
   cause a display unit to display a message indicating that the synchronization processing is not to be started, in a case where it is determined that the number of servers each executing management of setting information stored in other apparatus is two or more.

7. The information processing apparatus according to claim 1, wherein the at least one processor executes instructions in the memory device to:
   perform control for starting the synchronization processing by recording the setting information stored in the storage unit into a database managed by a server, and for notifying the server of update information indicating update content in a case where the setting information stored in the storage unit is updated.

8. The information processing apparatus according to claim 1, wherein the at least one processor executes instructions in the memory device to:
   control a scanner that generates image data by reading an image, or a printer that performs print processing for forming an image on a sheet; and
   control operation of the scanner or the printer by using the setting information stored in the storage unit.

9. A control method for an information processing apparatus, the control method comprising:
   storing setting information of the information processing apparatus in a storage unit;
   detecting a number of servers each of which manages at least setting information stored in other apparatus, among apparatuses connected to the information processing apparatus via a network;
   determining whether or not the information processing apparatus is a server that manages the setting information stored in the other apparatus; and
   controlling whether or not to start synchronization processing for synchronizing the setting information stored in the storage unit and the setting information stored in the server with each other based on a determination result of determining whether or not the information processing apparatus is a server that manages the setting information stored in the other apparatus and based on the number of servers each of which manages at least the setting information stored in the other apparatus among the apparatuses connected to the information processing apparatus via the network,
   wherein, in the controlling,
   if the determination result indicates that the information processing apparatus is not the server and further if the number of detected servers is one, the synchronization processing for synchronizing the setting information stored in the storage unit and the setting information stored in the server with each other is started,
   if the determination result indicates that the information processing apparatus is the server and further if a sum of the number of detected servers and one is one, the synchronization processing for synchronizing the setting information stored in the storage unit and the setting information stored in the server with each other is started,
   if the determination result indicates that the information processing apparatus is not the server and further if the number of detected servers is two, or three or more, neither of the two detected servers, or none of the three or more detected servers, starts the synchronization processing for synchronizing the setting information stored in the storage unit and the setting information stored in the server with each other,
   if the determination result indicates that the information processing apparatus is the server and further if a sum of the number of detected servers and one is two, or three or more, the synchronization processing for synchronizing the setting information stored in the storage unit and the setting information stored in the server with each other is not started.

10. The control method according to claim 9, wherein, in a case where address information for communicating with a server to be caused to manage the setting information stored in the storage unit is set in the information processing apparatus, processing for causing a server corresponding to the address information to manage the setting information stored in the storage unit is started, regardless of the number of servers.

11. The control method according to claim 9, further comprising performing display control for causing a display unit to display a message indicating that the synchronization processing is not to be started, in a case where the number of servers detected by the detecting is two or more.

12. The control method according to claim 9, wherein the performing the synchronization processing performs control for starting the synchronization processing by recording the setting information stored in the storage unit into a database managed by a server, and for notifying the server of update information indicating update content in a case where the setting information stored in the storage unit is updated.

13. A non-transitory computer-readable storage medium storing a computer-executable program including instructions, which when executed by one or more processors of an information processing apparatus, cause the information processing apparatus to perform operations comprising:
   storing setting information of the information processing apparatus in a storage unit;
   detecting a number of servers each of which manages at least setting information stored in other apparatus, among apparatuses connected to the information processing apparatus via a network;
   determining whether or not the information processing apparatus is a server that manages the setting information stored in the other apparatus; and
   controlling whether or not to start synchronization processing for synchronizing the setting information stored in the storage unit and the setting information stored in the server with each other based on a determination result of determining whether or not the information processing apparatus is a server that manages the setting information stored in the other apparatus and based on the number of servers each of which manages at least the setting information stored in the other apparatus among the apparatuses connected to the information processing apparatus via the network, wherein, in the controlling, if the determination result indicates that the information processing apparatus is not the server and further if the number of detected servers is one, the synchronization processing for synchronizing the setting information stored in the storage unit and the setting information stored in the server with each other is started, if the determination result indicates that the information processing apparatus is the server and further if a sum of the number of detected servers and one is one, the synchronization processing for synchronizing the setting information stored in the storage unit and the setting information stored in the server with each other is started, if the determination result indicates that the information processing apparatus is not the server and further if the number of detected servers is two, or three or more, neither of the two detected servers, or none of the three or more detected servers, starts the synchronization processing for synchronizing the setting information stored in the storage unit and the setting information stored in the server with each other, if the determination result indicates that the information processing apparatus is the server and further if a sum of the number of detected servers and one is two, or three or more, the synchronization processing for synchronizing the setting information stored in the storage unit and the setting information stored in the server with each other is not started.

* * * * *